United States Patent
Tsengas

(10) Patent No.: US 7,341,019 B1
(45) Date of Patent: Mar. 11, 2008

(54) HYBRID WOOD/PLASTIC DOG FEEDING TABLE AND KIT

(76) Inventor: Steven Tsengas, 1300 East St., Fairport Harbor, OH (US) 44077

( * ) Notice: Subject to any disclaimer, the term of this patent is extended or adjusted under 35 U.S.C. 154(b) by 0 days.

(21) Appl. No.: 11/502,124

(22) Filed: Aug. 10, 2006

Related U.S. Application Data

(60) Provisional application No. 60/706,908, filed on Aug. 11, 2005.

(51) Int. Cl.
*A01K 5/00* (2006.01)
(52) U.S. Cl. .................................... 119/61.5
(58) Field of Classification Search ............. 119/61.1, 119/61.5, 61.57, 69.5, 72, 51.5; 108/26, 108/158.11, 158.12
See application file for complete search history.

(56) References Cited

U.S. PATENT DOCUMENTS

| | | | | |
|---|---|---|---|---|
| 1,855,314 A | * | 4/1932 | Schacht | 119/51.5 |
| 2,606,522 A | * | 8/1952 | Harris | 119/69.5 |
| 4,658,759 A | * | 4/1987 | Brown | 119/61.5 |
| 4,699,089 A | * | 10/1987 | Teschke | 119/51.5 |
| 5,327,838 A | * | 7/1994 | Beltman | 108/25 |

* cited by examiner

*Primary Examiner*—Rob Swiatek
(74) *Attorney, Agent, or Firm*—John D. Gugllotta; Mandy Seuffert

(57) ABSTRACT

A dog feeding table having an elevated dog feeding table which incorporates an increased aesthetic appearance. A plastic molded base is provided with a choice of finishes to match kitchen decor. Further, the base incorporating a raised ridge around its circumference with a raised lip around the bowl openings to prevent water or food from falling. Legs can be added by force-fit into receptacles molded into the base and a wooden shelf can rest on top of the base to hold the feeding bowls. The instant abstract is neither intended to define the invention disclosed in this specification nor intended to limit the scope of the invention in any way.

8 Claims, 4 Drawing Sheets

HYBRID WOOD/PLASTIC DOG FEEDING TABLE AND KIT

RELATED APPLICATIONS

The present invention claims the benefit of U.S. Provisional Application No. 60/706,908, filed on Aug. 11, 2005. The entire disclosure and contents of the above applications are hereby incorporated by reference.

BACKGROUND OF THE INVENTION

1. Field of the Invention

The present invention relates generally to dog feeding tables and, more particularly, to a dog feeding table that incorporates the benefits associated with multiple types of materials of construction.

2. Description of the Related Art

Premium materials are becoming commercially popular for animal feeds due primarily to their premium appearance. As part of this trend wooden pet feeders are gaining popularity due to their appearance in coordinating with the cupboards and cabinetry normally available in user's homes. However, the use of wood for dog feeding tables has some major disadvantages as compared to plastic feeders. These include:

The use of wood, especially on the top horizontal surfaces, absorbs saliva, moisture such as to cause rot and odors to develop. This use of paint coatings does not alleviate this.

Current wood feeder tables do not incorporate a raised ridge around the outside circumference, or a raised lip around any bowl area. This feature is important for keeping food and water on the table top and preventing spillage. To incorporate such a feature would add significant material, processing and cost.

The rate of price increases for wood has exceeded that of plastics.

And, normally the delivery of such wooden feeders requires the customer to receive a boxed, disassembled "kit" with which they are to assemble using hand tools such as screw drivers and/or piers.

Consequently, a need has been felt for providing a dog feeding table that provides an increased aesthetic appearance without the above mentioned disadvantages.

SUMMARY OF THE INVENTION

It is therefore an object of the present invention to provide an improved It is therefore an object of the present invention to provide a dog feeding table that provides an increased aesthetic appearance without the above mentioned disadvantages.

It is a feature of the present invention to provide an elevated dog feeding table which incorporates a plastic molded base with a choice of finishes to match kitchen decor.

Further, the base with incorporate a raised ridge around its circumference with a raised lip around the bowl openings to prevent water or food from falling. Finally, wooden legs can be added by force-fit into receptacles molded into the base and a wooden shelf can rest on top of the base to hold the feeding bowls.

BRIEF DESCRIPTION OF THE DRAWINGS

The advantages and features of the present invention will become better understood with reference to the following more detailed description and claims taken in conjunction with the accompanying drawings, in which like elements are identified with like symbols and in which:

DESCRIPTION OF THE PREFERRED EMBODIMENTS

The best mode for carrying out the invention is presented in terms of its preferred embodiment, herein depicted within the FIGS. 1-6.

1. Detailed Description of the Figures

Figure 1:
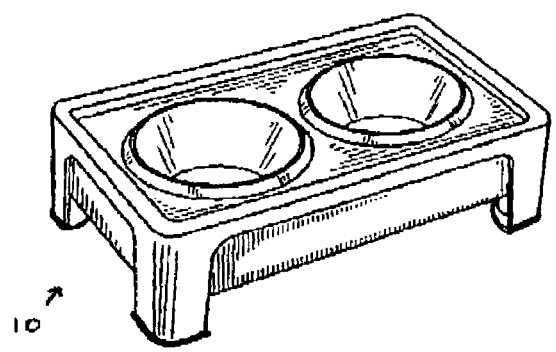
FIG. 1 is a perspective view of a dog feeding table according to a first preferred embodiment of the present invention, shown at a first height configuration.
Figure 2:
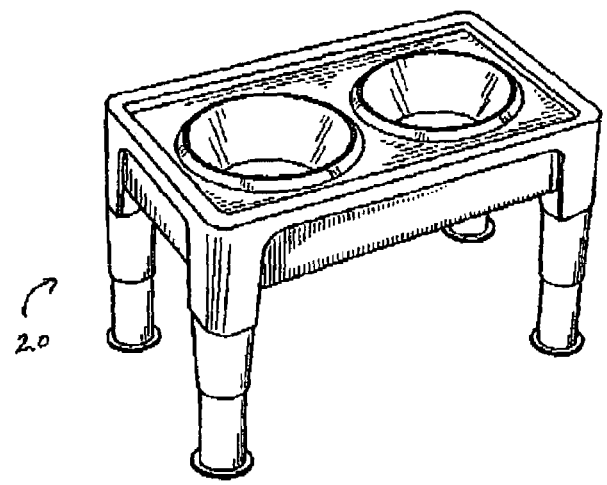
FIG. 2 is a perspective view of a dog feeding table according to a second preferred embodiment of the present invention, shown at a second height configuration.
Figure 3:
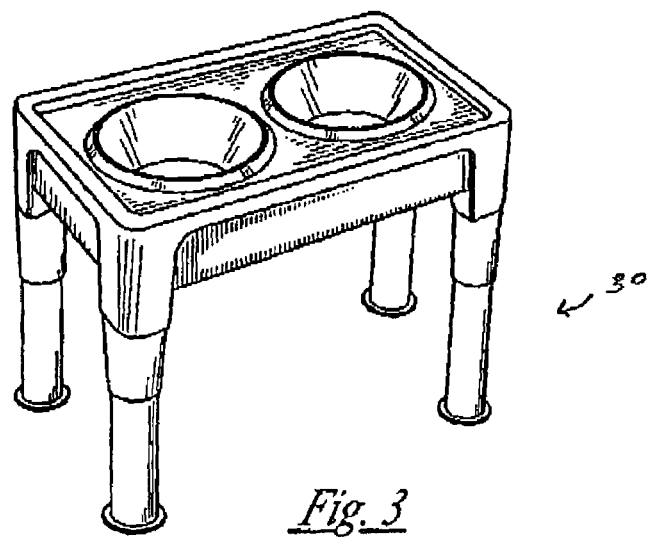
FIG. 3 is a perspective view of a dog feeding table according to a third preferred embodiment of the present invention, shown at a third height configuration.

Referring now to FIG. 1 through FIG. 3, hybrid wood/plastic dog feeding tables are provided that provides a dog feeding table that provides an increased aesthetic appearance without the above mentioned disadvantages. Designed to be adaptable to various sized dogs, a small dog table 10, intermediate table 20, or tall table 30 are shown to allow for selection to accommodate a specific bread or breeds of dog.

Figure 4A:
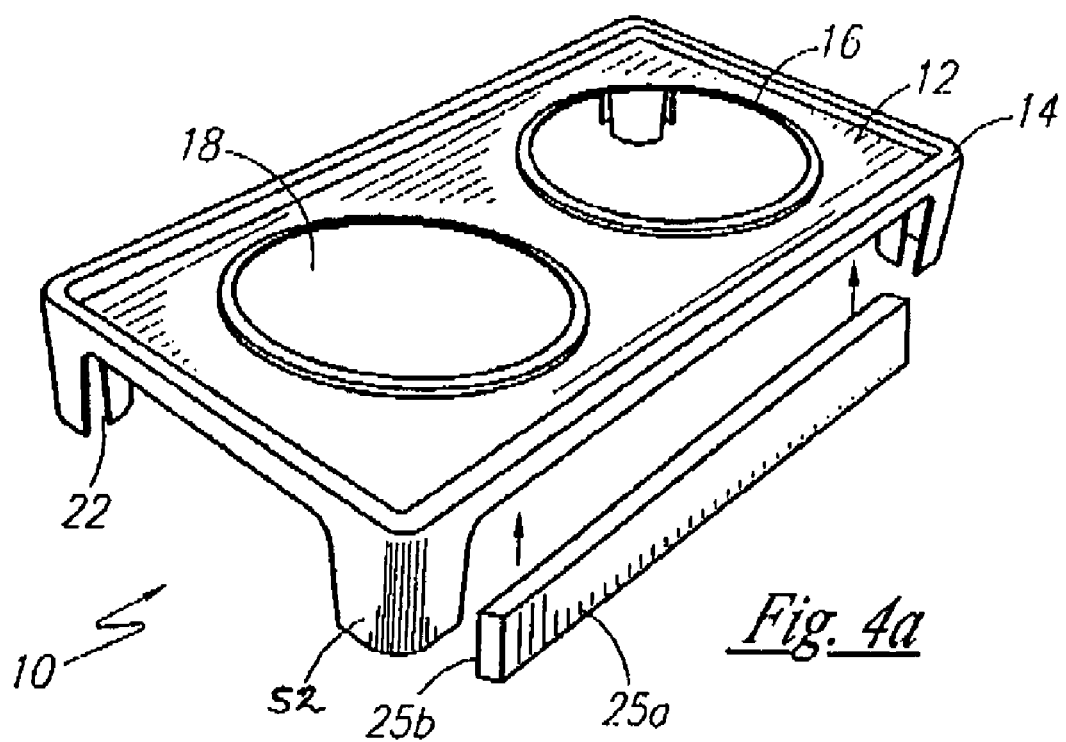
FIGS. 4A and 4B are top and bottom perspective views, respectively, of a base 12 for use with a hybrid material dog feeding table according to the first preferred embodiment of the present invention.
Figure 4B:
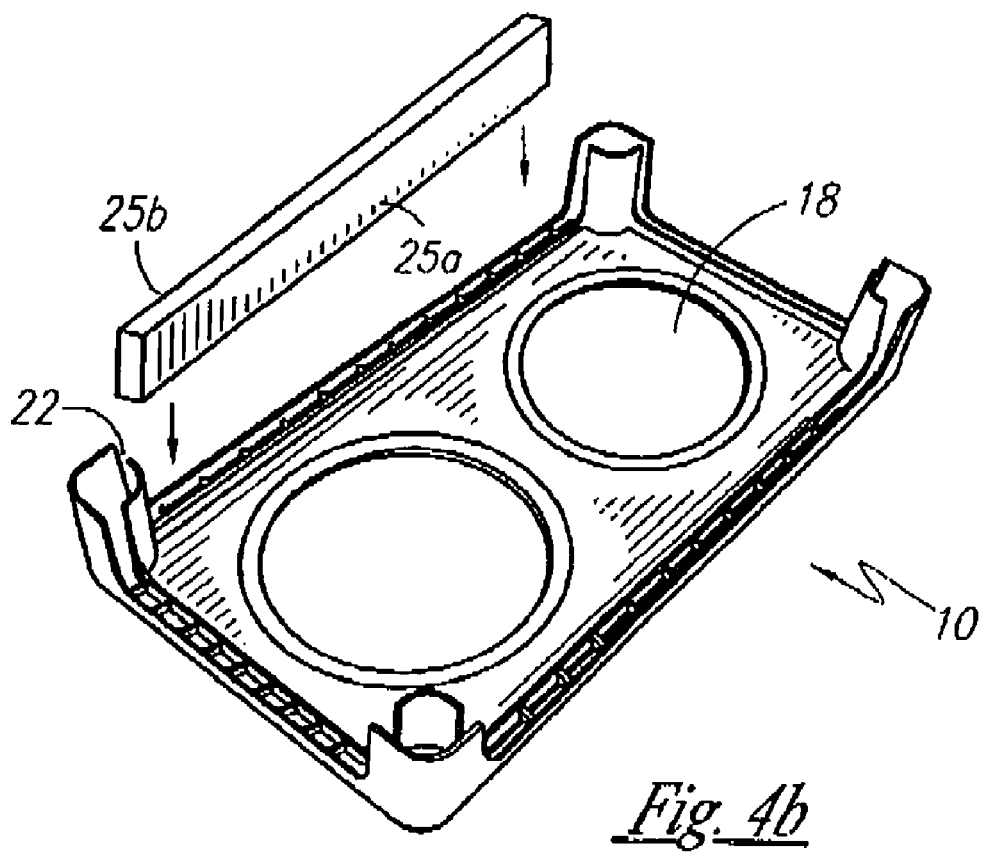

As shown in conjunction with FIGS. 4A and 4B, the small dog table 10 incorporates a plastic molded base 12 with a choice of finishes to match kitchen decor. Further, the base 12 incorporates a raised ridge 14 around its circumference with a raised lip 16 around the bowl openings 18 to prevent water or food from falling. In this embodiment, the legs 52 are formed integrally extending downward from the base 12, and form retention slots 22 for receiving a reversible side panel 24. A series of four such side panels 24 can be fastened in a like manner, with each panel having a first finished surface 25a opposite a second finished surface 25b, with each such surface 25 having a different aesthetic appearance. In this manner, placement of the panels 24 with the first finished surface 25a outward would form a table having a different style, color, decor or aesthetic than if the second finished surface 25b is placed outward.

Figure 5:
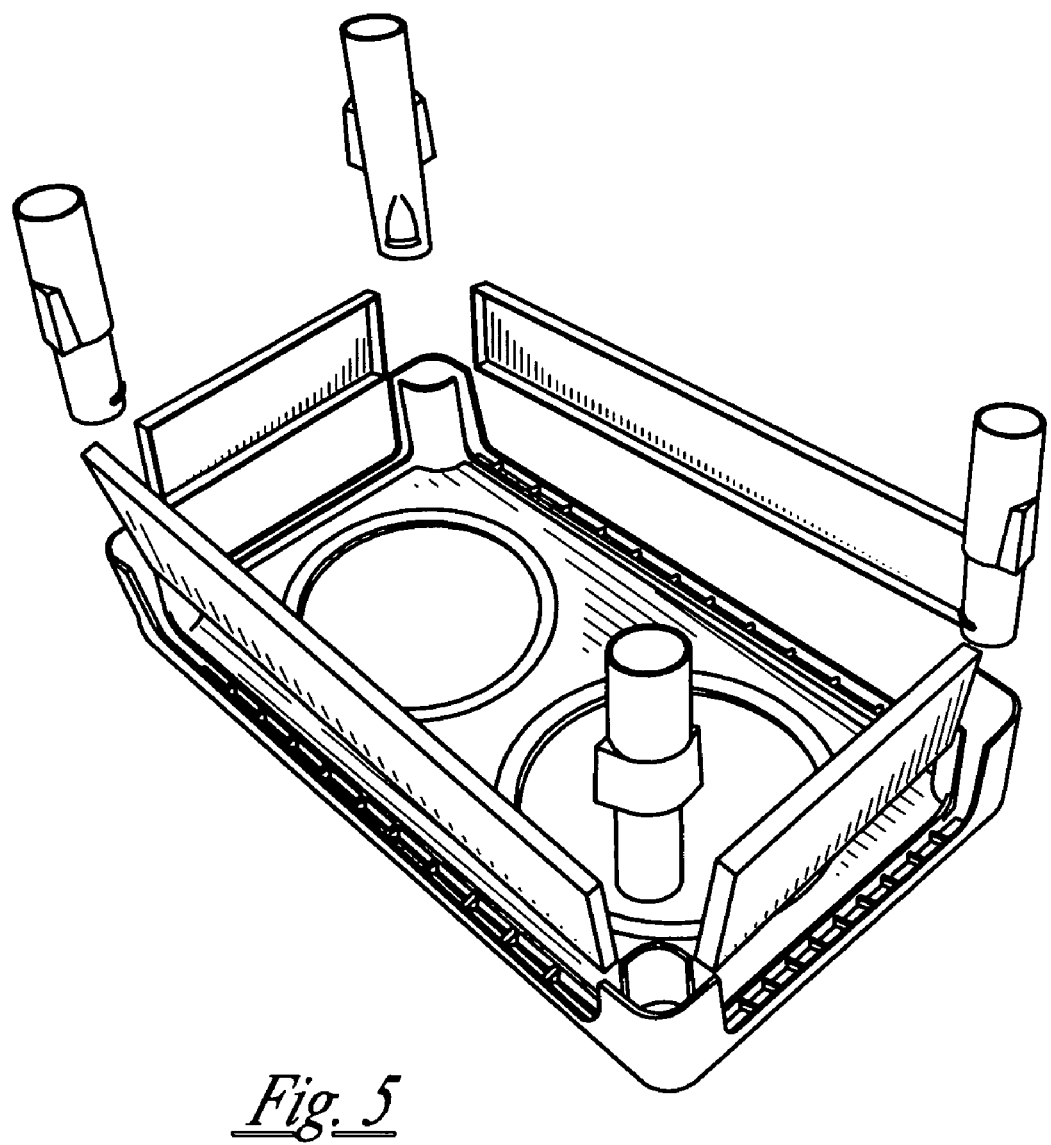
FIG. 5 is a bottom exploded perspective view of the second preferred embodiment of FIG. 2.
Figure 6:
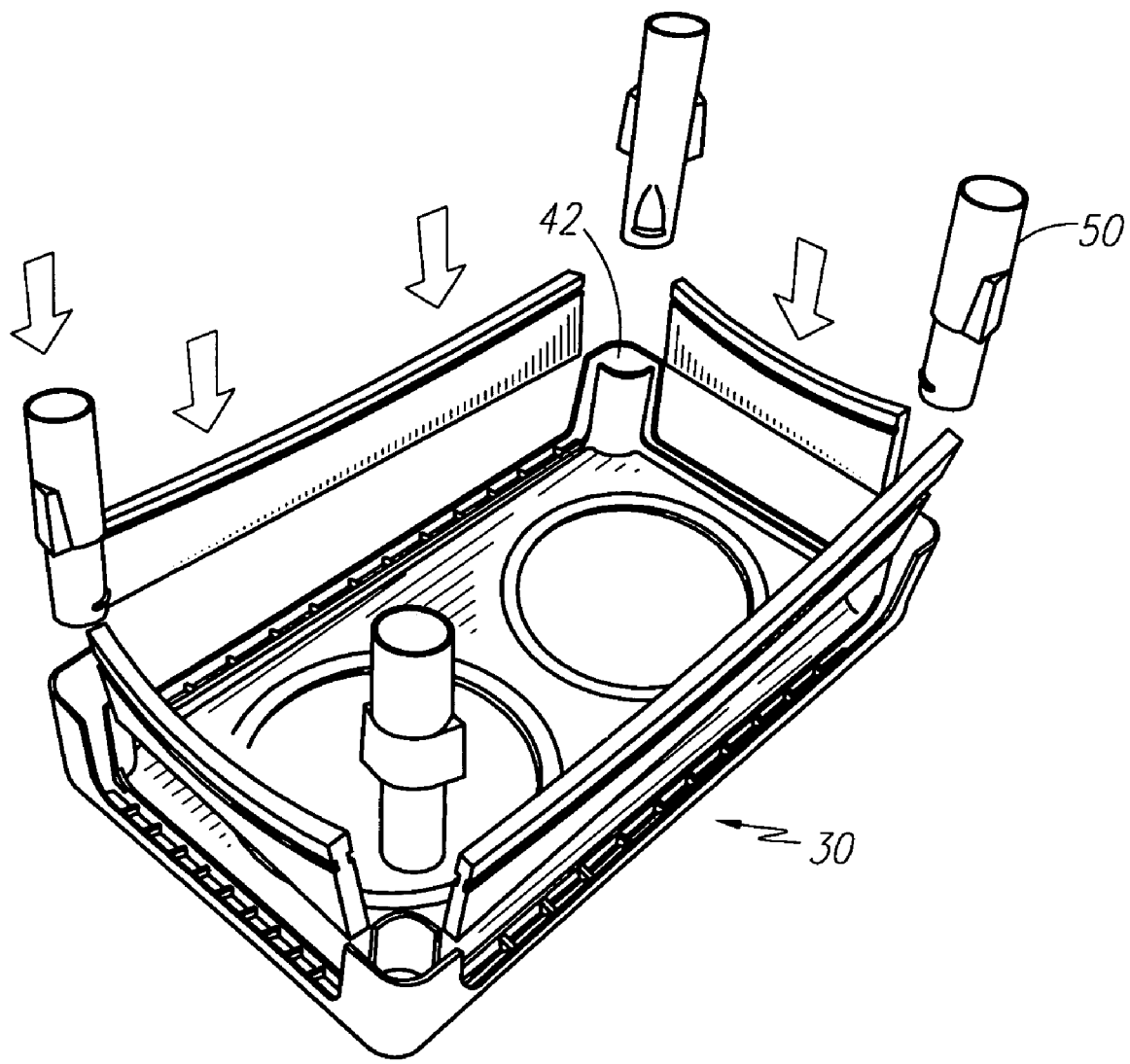
FIG. 6 is a bottom perspective views of the third preferred embodiment of FIG. 3.

As shown in FIG. 5, the intermediated sized dog table 20 incorporates the plastic molded base 12 and side panels 24 of the small dog table 10, but further comprises a series of leg extensions 40 are added by force-fit into receptacles 42 molded into the base 12. Similarly, as shown in FIG. 6 an alternate size leg extension 50 are shown for providing additional height.

2. Operation of the Preferred Embodiment

The various embodiments depicted herein as exemplary, and are used to communicate the various features and functions of the present invention. As such, it is anticipated that these feature can appear in various combinations. A further innovation presently provided by the configurations disclosed is that any such pet feeder can be packaged flat in order to facilitate packaging and shipping. As such, it is anticipated that the legs 50, 50 can be folded or nested underneath the base 14 to allow for easy, contained shipping.

It is envisioned that other styles and configurations of the present invention can be easily incorporated into the teachings of the present invention, and only a few particular configurations shall be shown and described for purposes of clarity and disclosure and not by way of limitation of the scope.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments where chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

The invention claimed is:

1. A dog feeding table comprising:
    a plastic base forming at least one bowl opening on an upper surface;
    at least one feeding bowl held by said bowl opening;
    retention slots integrally formed by said base for receiving at least one side panel; and
    at least one side panel having a first finished surface opposite a second finished surface, with each surface having a different aesthetic appearance, said at least one side panel being reversible within said retention slots;
    a plurality of receptacles formed in an underside of said plastic base; and a same number of extension legs, wherein each leg is attached to a receptacle.

2. The dog feeding table of claim 1, wherein a series of four pairs of retention slots and four side panels are provided.

3. The dog feeding table of claim 2, wherein said first finished surface and said second finished surface are capable of being formed in a variety of finishes to match various kitchen decor.

4. The dog feeding table of claim 1, wherein said side panel is formed of wood.

5. The dog feeding table of claim 1, further comprising a ridge extending upward and circumscribing an outer perimeter of said upper surface.

6. A kit for forming a dog feeding, said kit comprising:
    a plastic base forming at least one bowl opening on an upper surface and further forming at least one pair of retention slots integrally formed by said base for receiving at least one side panel; and;
    at least one feeding bowl;
    at least one side panel having a first finished surface opposite a second finished surface, with each surface having a different aesthetic appearance wherein said first finished surface and said second finished surface are capable of being formed in a variety of finishes to match various kitchen decor, said at least one side panel being reversible within said retention slots;
    a plurality of receptacles formed in an underside of said plastic base; and a same number of extension legs, wherein each leg is attached to a receptacle.

7. The dog feeding table kit of claim 6, wherein said side panel is formed of wood.

8. The dog feeding table kit of claim 6, further comprising a plurality of extension legs for attachment to an underside of said plastic base.

* * * * *